(12) United States Patent
Zhang (10) Patent No.: US 10,137,465 B2
(45) Date of Patent: Nov. 27, 2018

(54) ELECTRIC SPRAYER (71) Applicant: SUZHOU CROSSTEC CO., LTD., Suzhou (CN)

(72) Inventor: Xiaobing Zhang, Suzhou (CN)

(73) Assignee: SUZHOU CROSSTEC CO., LTD., Suzhou (CN)

( * ) Notice: Subject to any disclaimer, the term of this patent is extended or adjusted under 35 U.S.C. 154(b) by 0 days.

(21) Appl. No.: 15/576,276

(22) PCT Filed: Aug. 22, 2016

(86) PCT No.: PCT/US2016/048096
§ 371 (c)(1),
(2) Date: Nov. 21, 2017

(87) PCT Pub. No.: WO2016/210450
PCT Pub. Date: Dec. 29, 2016

(65) Prior Publication Data
US 2018/0154386 A1    Jun. 7, 2018

(30) Foreign Application Priority Data

Jun. 25, 2015 (CN) .......................... 2015 1 0358463

(51) Int. Cl.
| | |
|---|---|
| *B05B 12/00* | (2018.01) |
| *H01M 2/10* | (2006.01) |
| *B05B 9/08* | (2006.01) |
| *B05B 15/40* | (2018.01) |

(52) U.S. Cl.
CPC .......... *B05B 9/0861* (2013.01); *B05B 12/002* (2013.01); *B05B 15/40* (2018.02); *H01M 2/1022* (2013.01); *H01M 2220/30* (2013.01)

(58) Field of Classification Search
CPC ...... B05B 9/0861; B05B 15/40; B05B 12/002
USPC ....................... 222/325, 333, 383.1; 239/146
See application file for complete search history.

(56) References Cited

U.S. PATENT DOCUMENTS

| | | | |
|---|---|---|---|
| 4,801,088 A | 1/1989 | Baker | |
| 4,865,255 A | 9/1989 | Luvisotto | |
| 4,925,105 A | 5/1990 | Lin | |
| 5,238,191 A * | 8/1993 | Gaymon | ................. B05B 7/244 222/63 |

(Continued)

FOREIGN PATENT DOCUMENTS

| | | |
|---|---|---|
| CN | 201267790 Y | 7/2009 |
| CN | 103008142 A | 4/2013 |

(Continued)

*Primary Examiner* — Vishal Pancholi
(74) *Attorney, Agent, or Firm* — SZDC Law P.C.

(57) ABSTRACT

An electric sprayer is provided. The electric sprayer includes a water tank and a spray device. The water tank is provided at the upper end with a sealing cover, and is provided at the front with a mounting seat, on which a motor, a pump and an electric outlet are fixed. A power supply, which is a lithium battery pack, is removably disposed on the electric outlet. The spray device is connected to a water outlet of the pump, whose water inlet is in communication with the water tank. With the technical solution of the present disclosure, the power supply is disposed in front of the water tank, which facilitates knapsack operation of the sprayer, and avoids the problem of heating the operator's back due to prolonged operation.

20 Claims, 7 Drawing Sheets

(56) References Cited

U.S. PATENT DOCUMENTS

| | | | |
|---|---|---|---|
| 5,421,520 A * | 6/1995 | Simonette | B08B 3/026 239/332 |
| 5,752,661 A * | 5/1998 | Lewis | B05B 9/0861 222/175 |
| 5,996,907 A | 12/1999 | Toetschinger et al. | |
| 6,070,808 A * | 6/2000 | Kildow | A01M 7/0035 239/146 |
| 6,446,881 B1 * | 9/2002 | You | B60S 3/044 239/146 |
| 6,833,072 B1 | 12/2004 | Krestine et al. | |
| 7,753,290 B2 * | 7/2010 | Jacques | A01M 7/0046 239/146 |
| 8,141,754 B2 * | 3/2012 | Conner | B05B 9/007 222/325 |
| 8,556,192 B2 * | 10/2013 | Wise | F04B 17/06 220/501 |
| 2004/0084552 A1 * | 5/2004 | Huartson | A01M 7/0039 239/146 |
| 2007/0125878 A1 * | 6/2007 | Hahn | B08B 3/026 239/332 |
| 2009/0269218 A1 * | 10/2009 | Gardner | B08B 3/026 417/234 |
| 2013/0196203 A1 | 8/2013 | Wachwitz et al. | |

FOREIGN PATENT DOCUMENTS

| | | |
|---|---|---|
| CN | 203695273 U | 7/2014 |
| CN | 204816977 U | 12/2015 |
| EP | 2777823 A1 | 9/2014 |

* cited by examiner

ELECTRIC SPRAYER

CROSS REFERENCE TO RELATED PATENT APPLICATION

This application is a national stage application of PCT/US2016/048096, filed on Aug. 22, 2016, which claims the priority benefit of Chinese Patent Application No. 201510358463.X, filed on Jun. 25, 2015, which is incorporated by reference in its entirety.

BACKGROUND

Technical Field

The present disclosure relates to the field of agricultural spray equipment technology, especially an electric sprayer.

Description of Related Art

The electric sprayers currently on the market generally use lead-acid batteries as the power source, which contain a great deal of lead and thus likely result in environmental pollution after being abandoned. Later there emerged a sprayer that uses lithium batteries as the power source, which are fixed on the water tank of the sprayer. However, it is inconvenient to charge the lithium batteries, and the sprayer can only be used after it has been charged; besides, with the power supply of the current electric sprayer disposed at the back of the water tank, when the electric sprayer is used in knapsack operation, the user's back is usually heated because the power supply and the water pump are both located on the user's back.

SUMMARY

In order to solve the problem of the prior art, a purpose of the present disclosure is to provide an electric sprayer that is simple in structure, in which the power supply is removably disposed in front of the water tank, can be removed for charging, and can be replaced for spraying after the power supply runs out.

In order to achieve the above purpose, the present disclosure provides a technical solution as follows:

An electric sprayer is provided, comprising a water tank and a spray device, the water tank being provided at the upper end with a sealing cover; the water tank is provided in front with a mounting seat, on which a motor, a pump and an electric outlet are fixed; a power supply, which is a lithium battery pack, is removably disposed on the electric outlet; the spray device is connected to a water outlet of the pump, whose water inlet is in communication with the water tank.

Further, the electric sprayer also includes a trolley seat and a roller disposed on the trolley seat, with the water tank removably disposed on the trolley seat.

Further, the support seat is provided with a positioning hole that is provided inside with a threaded knob, and the water tank is provided at the back with an inner threaded hole matching the threaded knob.

Further, the trolley seat comprises a base, a support seat and a pull rod disposed on the support seat, with the support seat vertically disposed on the base.

Further, the pull rod comprises an outer tube, an inner tube, a positioning joint and a grip, with the positioning joint fixed at the top of the outer tube; the inner tube, inserted into the outer tube via the positioning joint, is provided axially with a plurality of recesses; the positioning joint is provided with a bolt, which is provided at the inner side with a first boss matching the recesses and at the outer side with a second boss corresponding to the position of the first boss; the grip is provided with a third boss and a jammed block, and a circle of spring steel wire is fixed on the positioning joint, with the jammed block jammed on the spring steel wire; in the locked state, the third boss abuts the second boss, jamming the first boss in the recess of the inner tube; stretching or retracting the inner tube makes the grip move up and down relative to the inner tube, here the third boss escaping from the second boss, the first boss also escaping from the recess, thereby placing the inner tube in the unlocked state.

Further, the electric outlet comprises a fixing seat and a conductive sheet disposed on the fixing seat, the conductive sheet being electrically connected to the motor, the lithium battery pack being provided at its socket with a jack socket matching the conductive sheet.

Further, the electric outlet is slantwise fixed on the mounting seat.

Further, the electric outlet is connected with a power display circuit, and the mounting seat is provided with a power indicator controlled by the power display circuit.

Further, the mounting seat is provided with a regulating switch for manually regulating the output voltage of the lithium battery pack.

Further, the water inlet of the pump is in communication with the bottom of the water tank via a flexible pipe, whose water inlet is connected with a counterweight joint and a filter joint.

Further, the water tank is provided at the upper and lower parts with a fixing collar, respectively, which is used for fixing a strap.

Compared with the prior art, the present disclosure has the following advantages:

1. With the technical solution of the present disclosure, a lithium battery pack is used as the power supply of the sprayer, with a sprayer allowed to be provided with multiple power supplies; the lithium battery pack is removably disposed on the electric outlet, such that it is convenient to remove the lithium battery pack for charging; spraying can be carried out after the power supply is replaced, such that operation of the sprayer is not affected by exhaustion of the power supply, thus improving the utilization rate of the sprayer.

2. With the technical solution of the present disclosure, the power supply and the power device are both disposed in front of the water tank, which facilitates knapsack operation of the sprayer, and avoids the problem of heating the operator's back due to prolonged operation.

BRIEF DESCRIPTION OF THE DRAWINGS

In order to explain the technical solutions of the examples of the present disclosure more clearly, the drawings to be used in the examples will be simply described in the following. The drawings in the following are only some examples of the present disclosure, according to which those of ordinary skill in the art can also obtain other drawings without making an inventive effort.

The following is a listing of numeral references in the figures: 1. A water tank; 11. a sealing cover; 2. a mounting seat; 21. an electric outlet; 211. a fixing seat; 212. a conductive sheet; 22. a motor; 23. a pump; 3. a lithium battery pack; 31. a socket; 311. a jack socket; 4. a trolley seat; 41. a base; 42. a support seat; 421. a threaded knob; 43. a pull rod; 431. an outer tube; 432. an inner tube; 4321. a recess; 433. a positioning joint; 4331. a bolt; 4332. a first boss; 4333. a second boss; 4334. a groove; 434. a grip; 4341. a third boss; 4342. a jammed block; 435. a spring steel wire; 5. a roller; and 6. a spray device.

DETAILED DESCRIPTION OF THE PREFERRED EMBODIMENTS

The above solutions will be further described below with reference to specific examples. It should be understood that these examples are intended to illustrate the present disclosure without limiting the scope of the present disclosure. The implementation conditions used in the examples can be further adjusted according to the conditions of a specific manufacturer, the implementation conditions not indicated being usually the routine experimental conditions.

As shown in FIGS. 1-8 are the examples of the present disclosure, which provide an electric sprayer that can be used in agricultural spray or washing vehicles. The electric sprayer comprises a water tank 1 and a spray device 6, the water tank 1 being provided at the upper end with a sealing cover 11, the sealing cover 11 being provided with an air hole; the water tank 1 is provided at the inlet with a filter screen, and in front with a mounting seat 2; the power supply and the power device of the sprayer are both disposed on the mounting seat 2, on which a motor 22, a pump 23 and an electric outlet 21 are fixed; a power supply, which is a lithium battery pack 3, is removably disposed on the electric outlet 21, such that the lithium battery pack 3 can be removed from the electric outlet 21 for charging after the power supply is exhausted, allowing spraying to be continued after the lithium battery pack is replaced; the spray device 6 is connected to the water outlet of the pump 23, and the water inlet of the pump 23 is in communication with the water tank 1. In this example, the water inlet of the pump 23 is connected to the bottom of the water tank 1 via a flexible pipe (not shown in the drawing), whose water inlet is provided with a counterweight joint and a filter joint, wherein the counterweight joint can make the flexible pipe always located at the bottom of the water tank 1, and the filter joint can filter out inclusion to avoid the spray device to be blocked and can also facilitate unplugging the flexible pipe from the water inlet of the pump 23 for cleaning.

Figure 1:
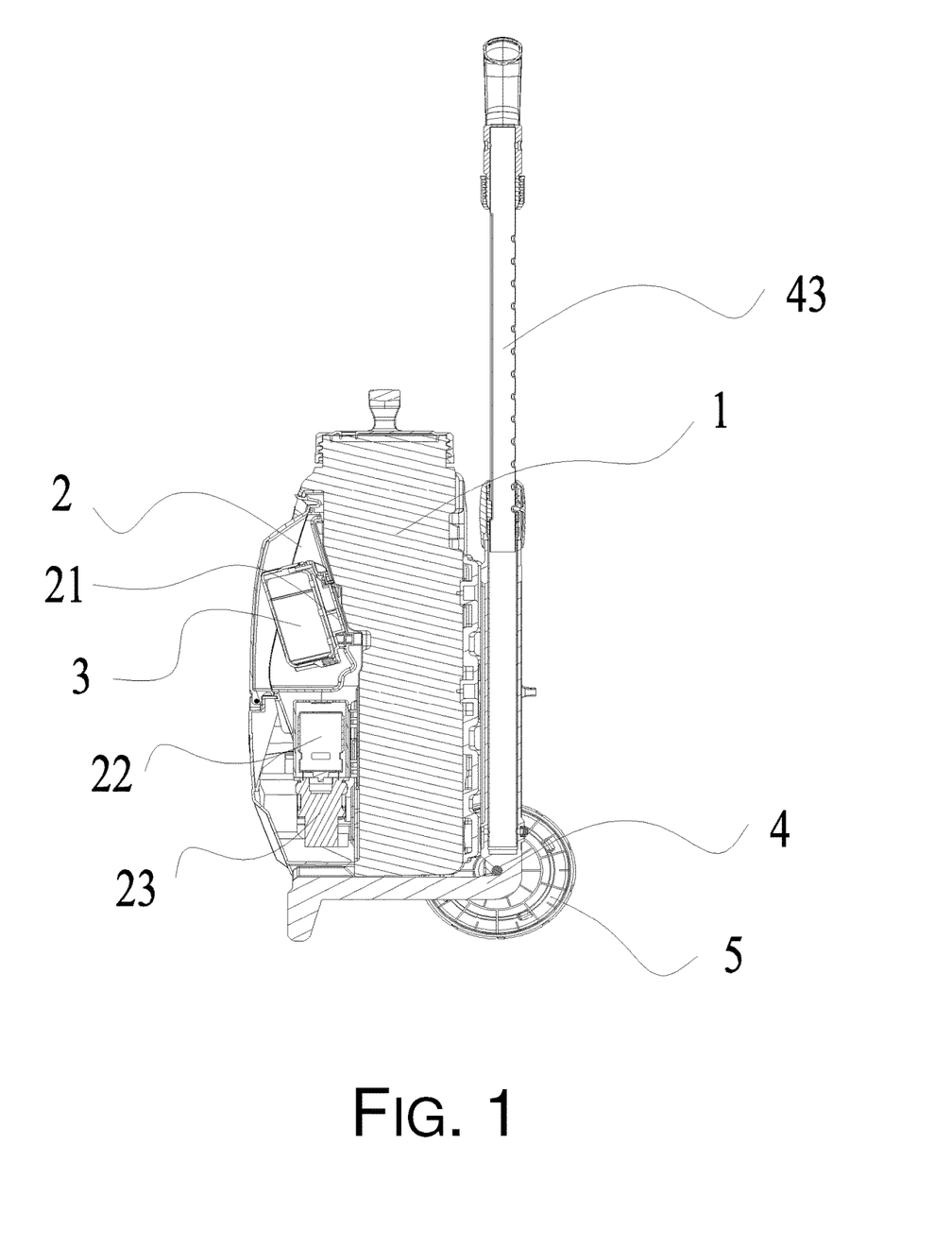
FIG. 1 is a structural schematic drawing of an example of the electric sprayer of the present disclosure.

In order to facilitate knapsack operation of the sprayer, the water tank 1 is provided at the upper and lower parts with a fixing collar, respectively, which is used for fixing a strap, and the power supply and the power device are both disposed in front of the water tank 1, which can avoid the problem of heating the operator's back due to prolonged operation and more facilitate the knapsack spray.

Figure 4:
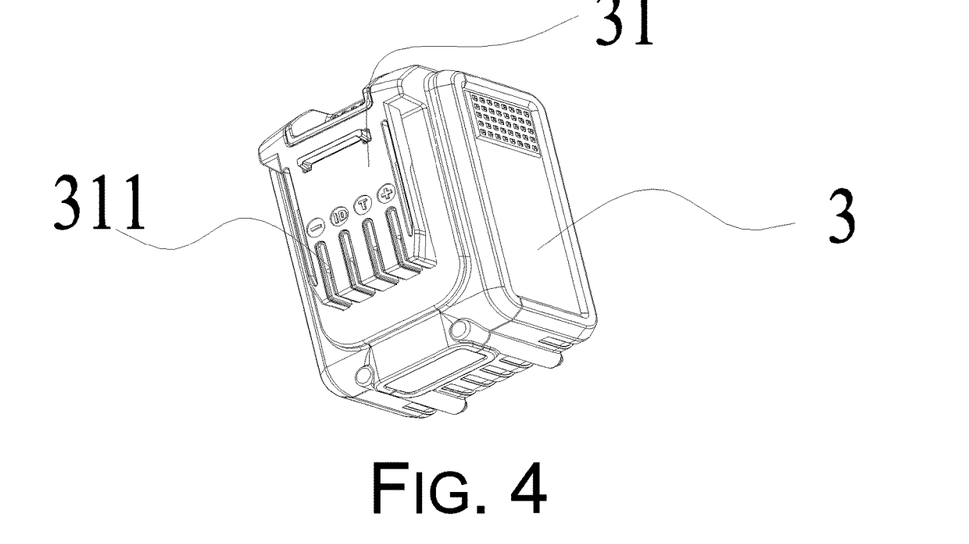
FIG. 4 is a structural schematic drawing of the electric outlet in the example of the present disclosure.
Figure 5:
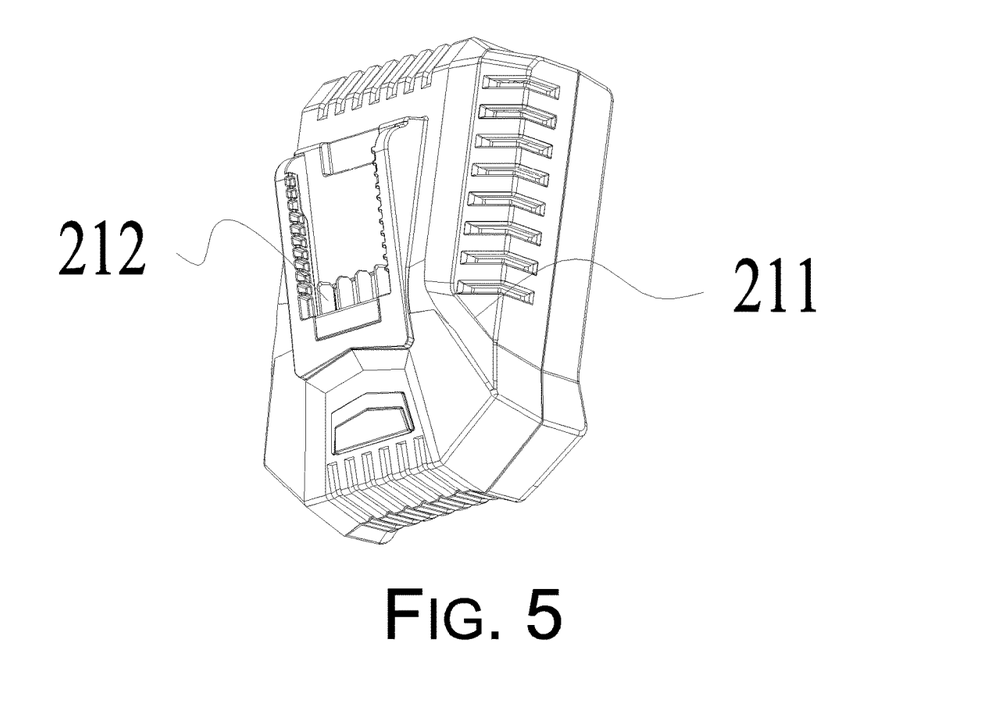
FIG. 5 is a schematic drawing of the lithium battery pack in the example of the present disclosure.

In this example, the electric outlet 21 comprises a fixing seat 211 and a conductive sheet 212 disposed on the fixing seat 211, the fixing seat 211 being made of plastics, the conductive sheet 212 being electrically connected to the motor 22; besides, the lithium battery pack 3 is provided at its socket 31 with a jack socket 311 matching the conductive sheet 212, with the lithium battery pack 3 being a common one of the prior art and not described here in detail in the present disclosure.

In order to facilitate plugging and unplugging the lithium battery pack 3, the electric outlet 21 can be slantwise disposed on the mounting seat 2. In implementing the present disclosure, the mounting seat 2 can be divided into two parts, one of them being fixedly provided with the motor 22 and the pump 23 sealed in the mounting seat 2, the other being an open storehouse allowed to have a storehouse door, with the storehouse provided with the electric outlet 21 on which the lithium battery pack 3 is removably disposed.

In order to show the user the power of the lithium battery pack 3 at any time so as to charge the lithium battery pack 3 in time, the electric outlet 21 is also connected with a power display circuit, and the mounting seat 2 is provided with a power indicator controlled by the power display circuit. While in use, the power display circuit makes the power indicator show different colors (green indicates full charge, and red indicates low charge) based on the voltage value measured across the lithium battery pack.

For regulating the spray amount according to the actual need, the mounting seat 2 is provided with a regulating switch for manually regulating the output voltage of the lithium battery pack 3, so as to regulate the amount of water entering the pump 23.

Figure 9:
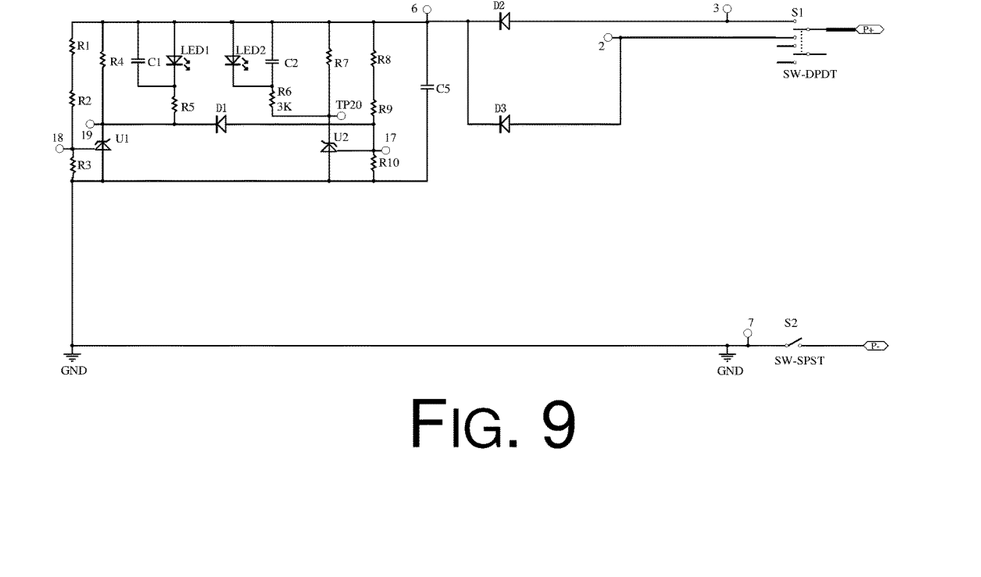
FIG. 9 is a principle diagram of the power display and speed control circuit in the present disclosure.

The power display and lithium battery pack output voltage regulating circuit in the present disclosure, as shown in FIG. 9, has the following specific work principle:

When the switch S1 is closed, current flows through the diode D2 (in a full speed state, with the current flowing through the diode D3 while in a half speed state), and the battery pack voltage is allocated to and detected by U1 after it is divided by R1, R2 and R3; when U1 detects that the voltage across R3 is greater than or equal to 2.5 V, the test point 19 is conducted to ground (Gnd), and the current flows through LED1 and R5 to light a green LED1, indicating that the battery pack is fully charged; meanwhile, the component voltage of R8, R9 and R10 makes the detected voltage of U2 not reach 2.5 V due to clamping of the diode D1, and U2 cannot conduct the test point 20 to Gnd, such that the red LED2 and the green LED1 are not lighted at the same time;

after the battery pack voltage decreases, when the voltage allocated to U1 is less than 2.5 V after the battery pack voltage is divided by R1, R2 and R3, U1 stops conducting the test point 19 to Gnd, the voltage at the position of the test point 19 rises to be equivalent to the battery pack voltage under the pulling-up action of R4, the green LED1 stops radiating, the clamping function of the diode D1 disappears, and the battery pack voltage is allocated to and detected by U2 after it is divided by R8, R9 and R10; when U2 detects that the voltage across R10 is greater than or equal to 2.5 V, the test point 20 is conducted to Gnd, and the current flows through the red LED2 and R6 to light LED2, indicating that the battery pack power is running out of electricity; and with the battery pack voltage continuing to decrease, with the voltage divided by R8, R9 and R10 and allocated to U2, when U2 detects that the voltage across R10 is less than 2.5 V, U2 stops conducting the test point 20 to Gnd, the voltage at the position of the test point 20 rises to be equivalent to the battery pack voltage under the pulling-up action of R7, and the red LED2 stops radiating, indicating that the battery pack capacity is nearly exhausted.

Figure 2:
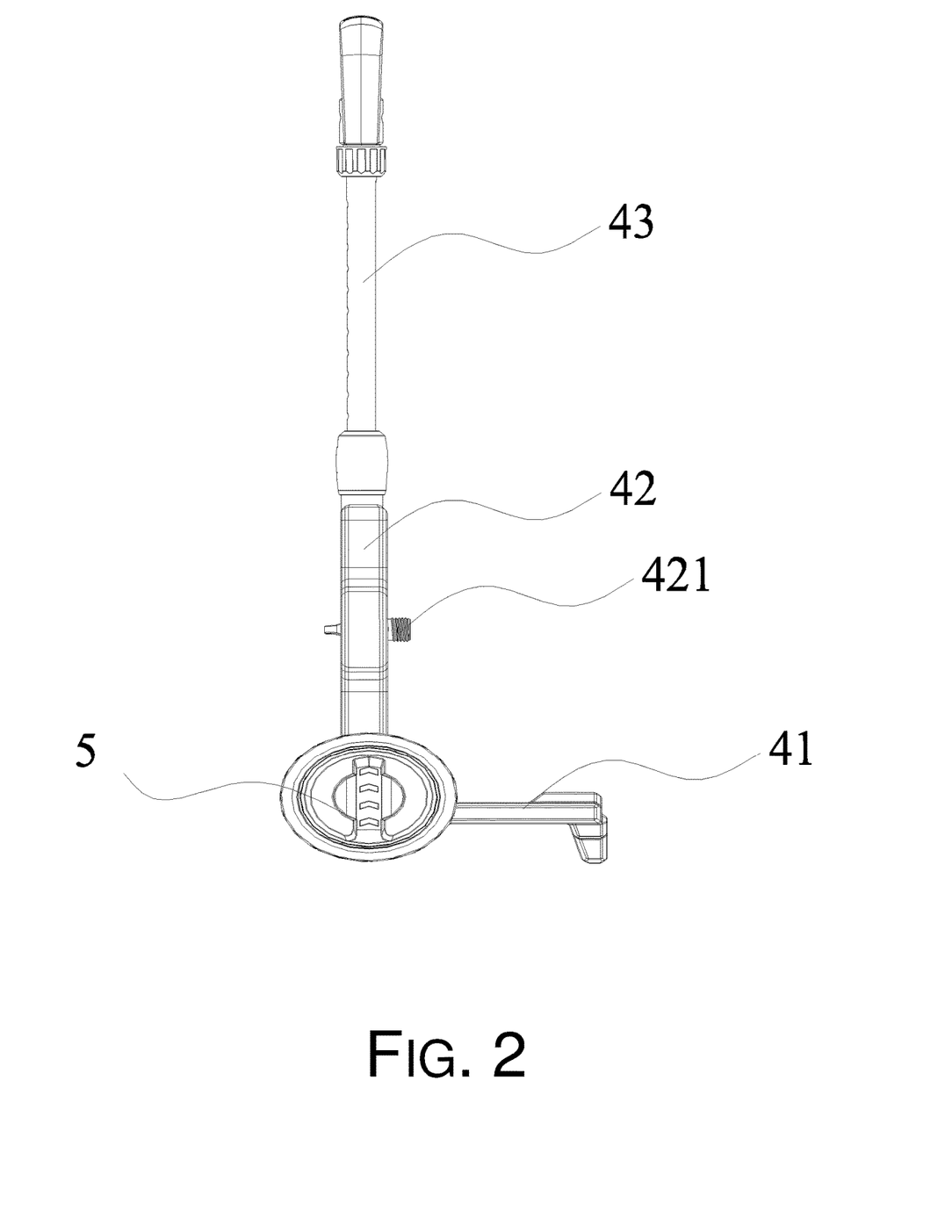
FIG. 2 is a structural schematic drawing of the trolley seat in the example of the present disclosure.
Figure 3:
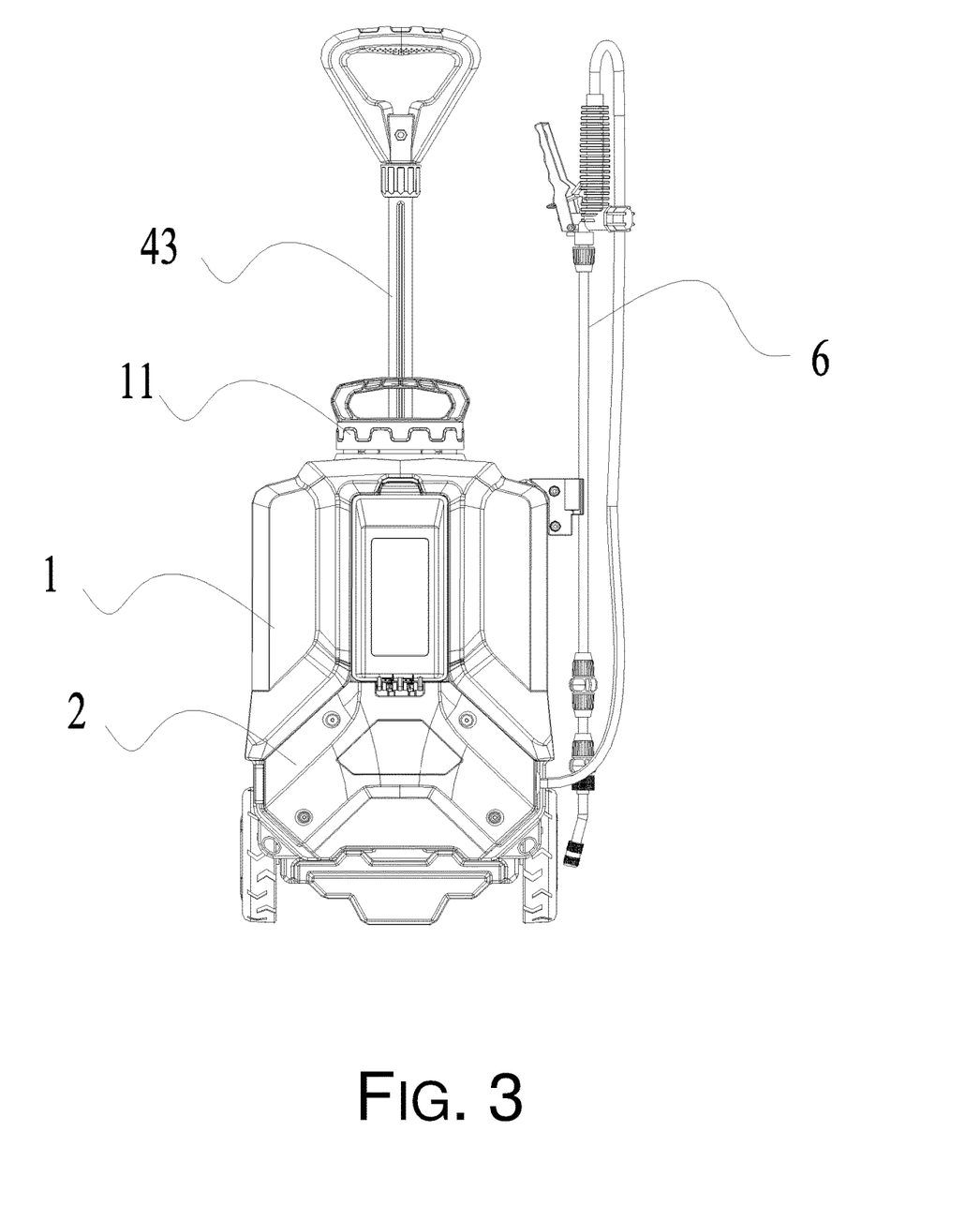
FIG. 3 is a schematic drawing of the overall appearance of the present disclosure.

In order to facilitate moving the electric sprayer of the present disclosure, this electric sprayer further includes a trolley seat 4 and a roller 5 disposed on the trolley seat 4, with the water tank 1 removably disposed on the trolley seat 4; the trolley seat 4 comprises a base 41, a support seat 42 and a pull rod 43 disposed on the support seat 42, with the support seat 42 vertically disposed on the base 41; in this example, the support seat 42 is provided with a positioning hole that is provided inside with a threaded knob 421, and the water tank 1 is provided at the back with an inner threaded hole matching the threaded knob 421; when mobile spray is needed, the water tank 1 is placed on the base 41, and the threaded knob 421 is screwed within the inner threaded hole at the back of the water tank 1, thereby fixing the water tank 1 on the trolley seat 4.

Figure 6:
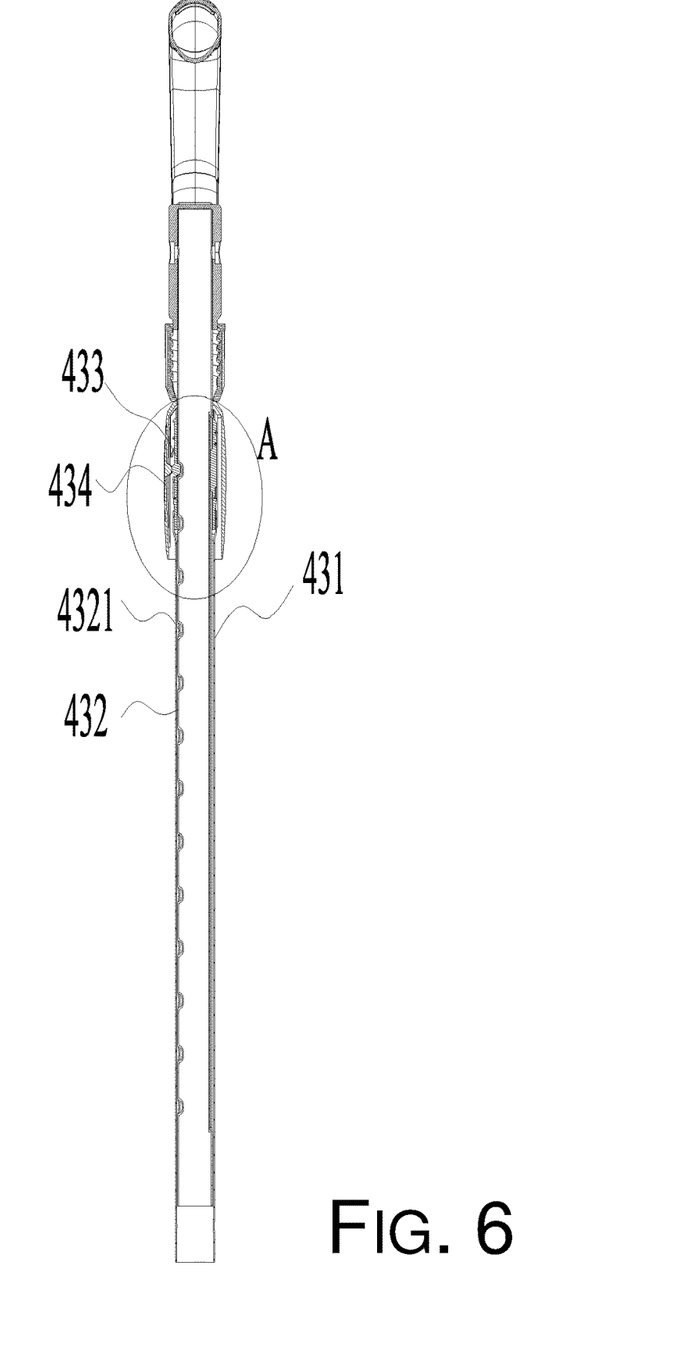
FIG. 6 is a structural schematic drawing of the pull rod in the example of the present disclosure.
Figure 7:
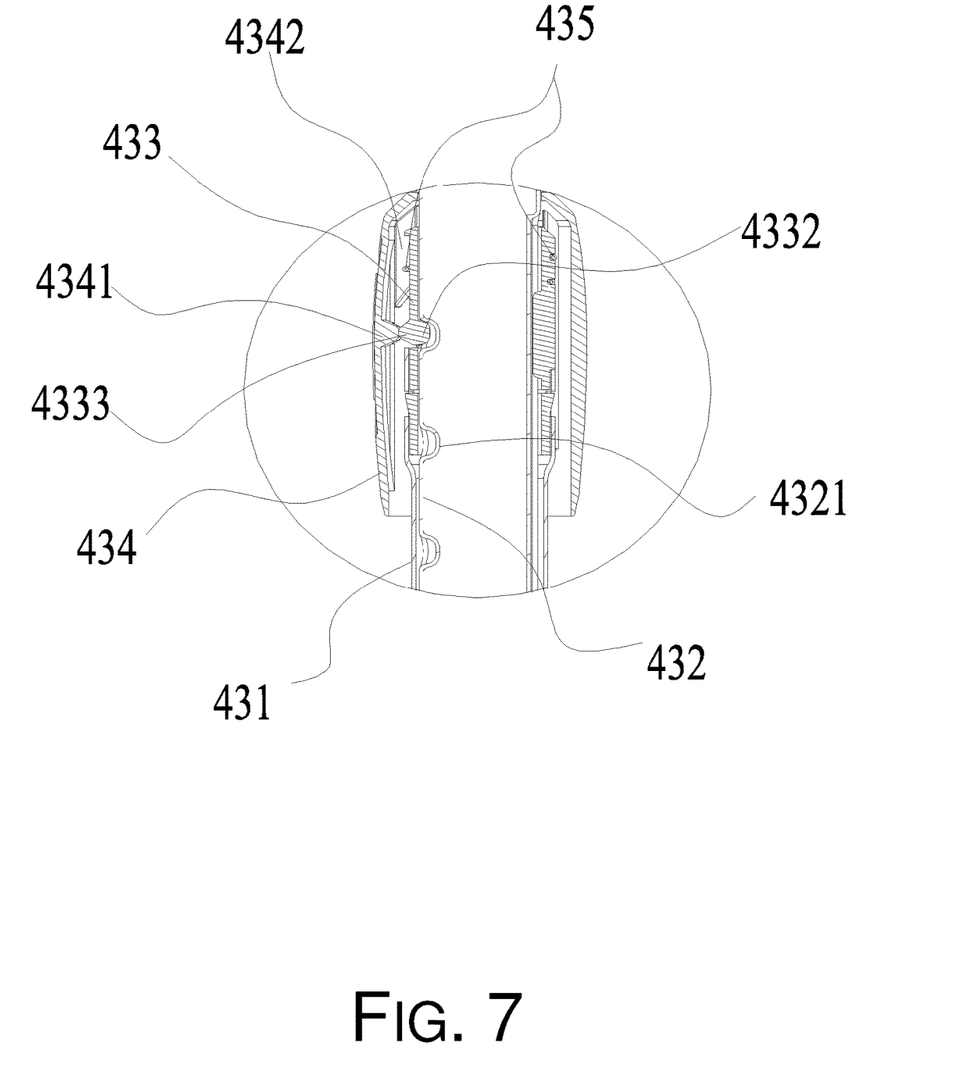
FIG. 7 is a partial enlarged drawing of the position A in FIG. 6.
Figure 8:
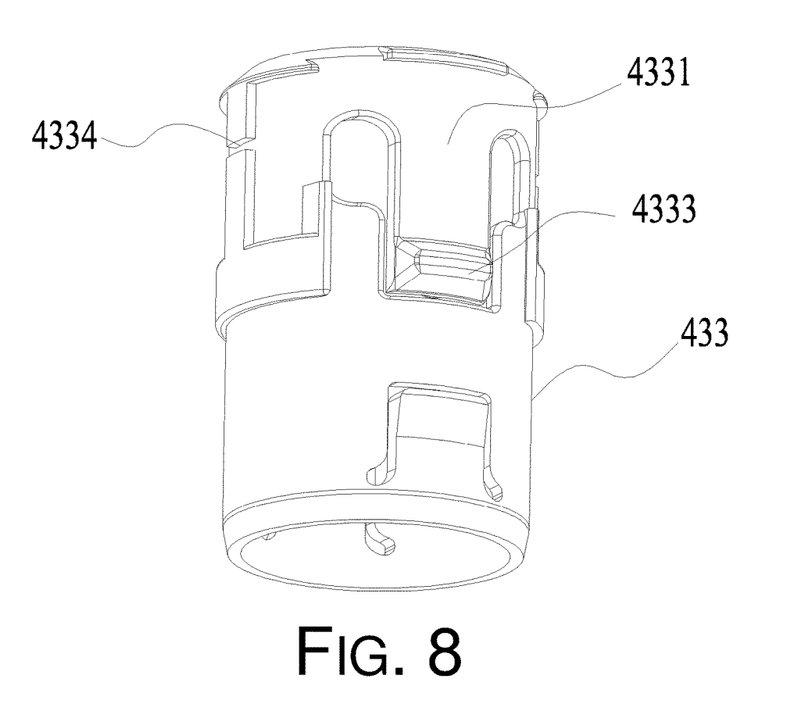
FIG. 8 is a structural schematic drawing of the positioning joint in the example of the present disclosure.

In order to further optimize the implementation effect of the present disclosure, as shown in FIGS. 6-7, the pull rod in the present disclosure is a retractable one, which comprises an outer tube 431, an inner tube 432, a positioning joint 433 and a grip 434, the outer tube 431 being fixed on the support seat 42, the positioning joint 433 being fixed at the top of the outer tube 1; the inner tube 432, inserted into the outer tube 431 via the positioning joint, is provided axially with a plurality of recesses 4321; the positioning joint 433 is provided with a bolt 4331, which is provided at the inner side with a first boss 4332 matching the recesses 4321 and at the outer side with a second boss 4333 corresponding to the position of the first boss 4332; the grip 434 is provided with a third boss 4341 and a jammed block 4342, and a circle of spring steel wire 435 is fixed on the positioning joint 433 that is provided with a convex rib; the convex rib is provided with a groove 4334, in which the spring steel wire 435 is fixed, with the jammed block 4342 of the grip 434 jammed on the spring steel wire 435; in the locked state, the third boss 4341 abuts the second boss 4333 and jams the first boss 4332 in the recess 4321 of the inner tube 432, thereby locking the inner tube 432; when the inner tube 432 is stretched or retracted, the grip 434 moves up and down relative to the inner tube 432; here the third boss 4341 escapes from the second boss 4333, and the first boss 4332 also escapes from the recess 4321, such that the inner tube 432 is placed in an unlocked state, and the grip 434 is loosened and reset under the action of the spring steel wire 435, the third boss 4341 on the grip 434 abutting the second boss 4333, the first boss 4332 on the positioning joint 433 being placed in the recess 4321 to fix the inner tube 432 on the outer tube 431.

In this example, the spray device 6 comprises a spray switch, a spray rod and a nozzle, with the spray rod connected to the water outlet of the pump 23 via the flexible pipe. It should be understood that the spray device might also be in other forms of the prior art, which will not be described here in detail in the present disclosure.

The above examples are used only for explaining the technical concept and characteristics of the present disclosure. They are provided to make those skilled in the art understand and implement the present disclosure, but do not limit the scope of protection of the present disclosure. All the equivalent alterations or modifications made according to the spiritual essence of the present disclosure should fall within the scope of protection of the present disclosure.

What is claimed is:

1. An electric sprayer, comprising:
   a water tank having an upper end, a front, a back and a bottom;
   a spray device;
   a trolley seat and a roller disposed on the trolley seat, with the water tank removably disposed on the trolley seat, and
   wherein the water tank is provided at the upper end with a sealing cover,
   wherein the water tank is provided at the front with a mounting seat on which a motor, a pump and an electric outlet are fixed,
   wherein a power supply, which is a lithium battery pack, is removably disposed on the electric outlet, wherein the spray device is connected to a water outlet of the pump,
   wherein the pump has a water inlet in communication with the water tank, and
   wherein the trolley seat comprises a support seat, wherein the support seat is provided with a positioning hole inside with a threaded knob, and wherein the water tank is provided at the back with an inner threaded hole matching the threaded knob.

2. The electric sprayer of claim 1, wherein the electric outlet comprises a fixing seat and a conductive sheet disposed on the fixing seat, wherein the conductive sheet is electrically connected to the motor, and wherein the lithium battery pack is provided at a socket thereof with a jack socket matching the conductive sheet.

3. The electric sprayer of claim 2, wherein the electric outlet is slantwise fixed on the mounting seat.

4. The electric sprayer of claim 2, wherein the electric outlet is connected with a power display circuit, and wherein the mounting seat is provided with a power indicator controlled by the power display circuit.

5. The electric sprayer of claim 2, wherein the mounting seat is provided with a regulating switch to manually regulate an output voltage of the lithium battery pack.

6. The electric sprayer of claim 1, wherein the electric outlet comprises a fixing seat and a conductive sheet disposed on the fixing seat, wherein the conductive sheet is electrically connected to the motor, and wherein the lithium battery pack is provided at a socket thereof with a jack socket matching the conductive sheet.

7. The electric sprayer of claim 6, wherein the electric outlet is slantwise fixed on the mounting seat.

8. The electric sprayer of claim 6, wherein the electric outlet is connected with a power display circuit, and wherein the mounting seat is provided with a power indicator controlled by the power display circuit.

9. The electric sprayer of claim 6, wherein the mounting seat is provided with a regulating switch to manually regulate an output voltage of the lithium battery pack.

10. The electric sprayer of claim 1, wherein the water inlet of the pump is in communication with the bottom of the water tank via a flexible pipe, and wherein a water inlet of the flexible pipe is connected with a counterweight joint and a filter joint.

11. An electric sprayer, comprising:
    a water tank having an upper end, a front, a back and a bottom;
    a spray device; and
    a trolley seat and a roller disposed on the trolley seat, with the water tank removably disposed on the trolley seat,
    wherein the water tank is provided at the upper end with a sealing cover, wherein the water tank is provided at the front with a mounting seat on which a motor, a pump and an electric outlet are fixed, wherein a power supply, which is a lithium battery pack, is removably disposed on the electric outlet, wherein the spray device is connected to a water outlet of the pump, wherein the pump has a water inlet in communication with the water tank, wherein the trolley seat comprises a base, a support seat and a pull rod disposed on the support seat, with the support seat vertically disposed on the base, and wherein the pull rod comprises an outer tube, an inner tube, a positioning joint and a grip, with the positioning joint fixed at a top of the outer tube, wherein the inner tube, inserted into the outer tube via the positioning joint, is provided axially with a plurality of recesses, wherein the positioning joint is provided with a bolt, which is provided at an inner side with a first boss matching the recesses and at an outer side with a second boss corresponding to a position of the first boss, wherein the grip is provided with a third boss and a jammed block, wherein a circle of spring steel wire is fixed on the positioning joint, with the jammed block jammed on the spring steel wire, wherein, in a locked state, the third boss abuts the second boss to jam the first boss in the recesses of the inner tube, wherein, when stretched or retracted, the inner tube makes the grip move up and down relative to the inner tube, with the third boss escaping from the second boss, and with the first boss also escaping from the recesses, thereby placing the inner tube in an unlocked state.

12. The electric sprayer of claim 11, wherein the electric outlet comprises a fixing seat and a conductive sheet disposed on the fixing seat, wherein the conductive sheet is electrically connected to the motor, and wherein the lithium battery pack is provided at a socket thereof with a jack socket matching the conductive sheet.

13. The electric sprayer of claim 12, wherein the electric outlet is slantwise fixed on the mounting seat.

14. The electric sprayer of claim 12, wherein the electric outlet is connected with a power display circuit, and wherein the mounting seat is provided with a power indicator controlled by the power display circuit.

15. The electric sprayer of claim 12, wherein the mounting seat is provided with a regulating switch to manually regulate an output voltage of the lithium battery pack.

16. The electric sprayer of claim 11, wherein the electric outlet comprises a fixing seat and a conductive sheet disposed on the fixing seat, wherein the conductive sheet is electrically connected to the motor, and wherein the lithium battery pack is provided at a socket thereof with a jack socket matching the conductive sheet.

17. The electric sprayer of claim 16, wherein the electric outlet is slantwise fixed on the mounting seat.

18. The electric sprayer of claim 16, wherein the electric outlet is connected with a power display circuit, and wherein the mounting seat is provided with a power indicator controlled by the power display circuit.

19. The electric sprayer of claim 16, wherein the mounting seat is provided with a regulating switch to manually regulate an output voltage of the lithium battery pack.

20. The electric sprayer of claim 11, wherein the water inlet of the pump is in communication with the bottom of the water tank via a flexible pipe, and wherein a water inlet of the flexible pipe is connected with a counterweight joint and a filter joint.

* * * * *